(12) United States Patent
Ren et al.

(10) Patent No.: US 7,747,642 B2
(45) Date of Patent: Jun. 29, 2010

(54) MATCHING ENGINE FOR QUERYING RELEVANT DOCUMENTS

(75) Inventors: Liwei Ren, Sunnyvale, CA (US); Shu Huang, San Jose, CA (US); Fei Huang, Fremont, CA (US); Aiguo Dong, Mountain View, CA (US); Dehua Tan, Milpitas, CA (US)

(73) Assignee: Trend Micro Incorporated, Tokyo (JP)

( * ) Notice: Subject to any disclaimer, the term of this patent is extended or adjusted under 35 U.S.C. 154(b) by 400 days.

(21) Appl. No.: 11/361,447

(22) Filed: Feb. 24, 2006

(65) Prior Publication Data
US 2006/0253439 A1 Nov. 9, 2006

Related U.S. Application Data

(60) Provisional application No. 60/679,314, filed on May 9, 2005.

(51) Int. Cl.
*G06F 17/30* (2006.01)
(52) U.S. Cl. ........................ 707/780; 707/917
(58) Field of Classification Search ........................ None
See application file for complete search history.

(56) References Cited

U.S. PATENT DOCUMENTS 5,325,091 A * 6/1994 Kaplan et al. ................. 341/51

| | | | |
|---|---|---|---|
| 6,493,709 B1 * | 12/2002 | Aiken | 707/4 |
| 6,584,470 B2 | 6/2003 | Veale | 707/102 |
| 7,031,972 B2 | 4/2006 | Ren et al. | 707/101 |
| 2003/0158725 A1 * | 8/2003 | Woods | 704/10 |
| 2003/0172066 A1 * | 9/2003 | Cooper et al. | 707/7 |
| 2006/0149820 A1 * | 7/2006 | Rajan et al. | 709/206 |

OTHER PUBLICATIONS

Chang, W.I. and E.L. Lawler "Approximate String Matching in Sublinear Expected Time", Proceedings of the 31$^{st}$ Annual Symposium on Foundations of Computer Science, Oct. 22-24, 1990, pp. 116-124.*

Monostori, K., A. Zaslavsky and H. Schmidt "Parallel and Distributed Document Overlap Detection on the Web", In Applied Parallel Computing: New Paradigms for HPC in Industry and Academia, Lecture Notes in Computer Science, vol. 1947, 2001, pp. 206-214.*

(Continued)

*Primary Examiner*—Luke S Wassum
(74) *Attorney, Agent, or Firm*—Okamoto & Benedicto LLP

(57) ABSTRACT

A system generates an output of documents having with a particular relevance range. The system receives an initial document comprising text, a list of documents for matching, each document comprising text, and a minimum substring match length. The system normalizes the text of the documents of the list of documents. The system searches common sub-strings between the text of the initial document and the text of each document of the list of documents. The system calculates a match percentage based on the search common sub-strings and outputs documents having a match percentage corresponding to a predetermined value. Also disclosed is a process for generating an output of documents within a particular relevance range.

11 Claims, 6 Drawing Sheets

OTHER PUBLICATIONS

Aho, A.V., J.E. Hopcroft and J.D. Ullman "Data Structures and Algorithms", Reading:Addison-Wesley Publishing Company, Mar. 1985, pp. 368-371. QA76.9.D35A38. ISBN 0-201-00023-7.*

Manber, U. and G. Myers "Suffix Arrays: A New Method for On-Line Searches", Proceedings of the 1st Annual ACM-SIAM Symposium on Discrete Algorithms, 1990, pp. 319-327.*

Chang, W.I. and E.L. Lawler "Sublinear Approximate String Matching and Biological Applications", Algorithmica, vol. 12, 1994, pp. 327-344.*

Ukkonen, E. "On-Line Construction of Suffix Trees", Algorithmica, vol. 14, 1995, pp. 249-260.*

Monostori, K., A. Zaslavsky and H. Schmidt "Parallel Overlap and Similarity Detection in Semi-Structured Document Collections", Proceedings of the 6th Annual Australasian Conference on Parallel and Real-Time Systems (PART '99), 1999.*

Shivakumar, A. and H. Garcia-Molina "Building a Scalable and Accurate Copy Detection Mechanism", Proceedings of the 1st ACM International Conference on Digital Libraries (DL '96), 1996, pp. 160-168.*

Monostori, K., A. Zaslavsky and H. Schmidt "MatchDetectReveal: Finding Overlapping and Similar Digital Documents", in M. Khosrow-Pour (ed.), Challenges of Information Technology Management in the 21st Century, May 21-24, 2000.*

Takabayashi, S. "A Brief Introduction to Suffix Array", downloaded from sary.sourceforge.net/docs/suffix-array.html, Nov. 14, 2000.*

University of Auckland "Hash Tables", downloaded from www.cs.auckland.ac.nz/software/AlgAnim/niemann/s_has.htm, Aug. 18, 2004.*

Anagnostopoulos, A. et al., "Sampling Search-Engine Results," Proceedings of the 14th International Conference on World Wide Web. WWW 2005. May 10-14, 2005, pp. 245-256, Chiba, Japan.

Chen, J. et al., "Knowledge Discovery and Data Mining Based on Power Plant Real-Time Database: A Survey," Proceedings of International Conference on Power Engineering, Oct. 8-12, 2001, pp. 1-5, Xi'an, China.

Chen, L. et al., "Template Detection for Large Scale Search Engines," SAC '06. Apr. 23-27, 2006, 5 pages, Dijon, France.

Hamilton, N., "The Mechanics of a Deep Net Metasearch Engine," Proceedings of the 12th International World Wide Web Conference, 2003, 2 pages.

Jessop, M. et al., "Pattern Matching Against Distributed Datasets," 6 pages.

Lai, W. C. et al., "An Anatomy of a Large-Scale Image Search Engine," IEEE MSE, Dec. 2002, 4 pages, Irvine.

Lavrenko, V. et al., "Relevance Models for Topic Detection and Tracking," 6 pages.

Pallickara, S. et al., "Incorporating an XML Matching Engine in Distributed Brokering Systems," Proceedings of the International Conference on Parallel and Distributed Processing Techniques and Applications, (PDPTA '03), 2003, pp. 1-7.

PCT International Search Report and Written Opinion, PCT/US06/17846, Oct. 18, 2006, 11 Pages.

* cited by examiner

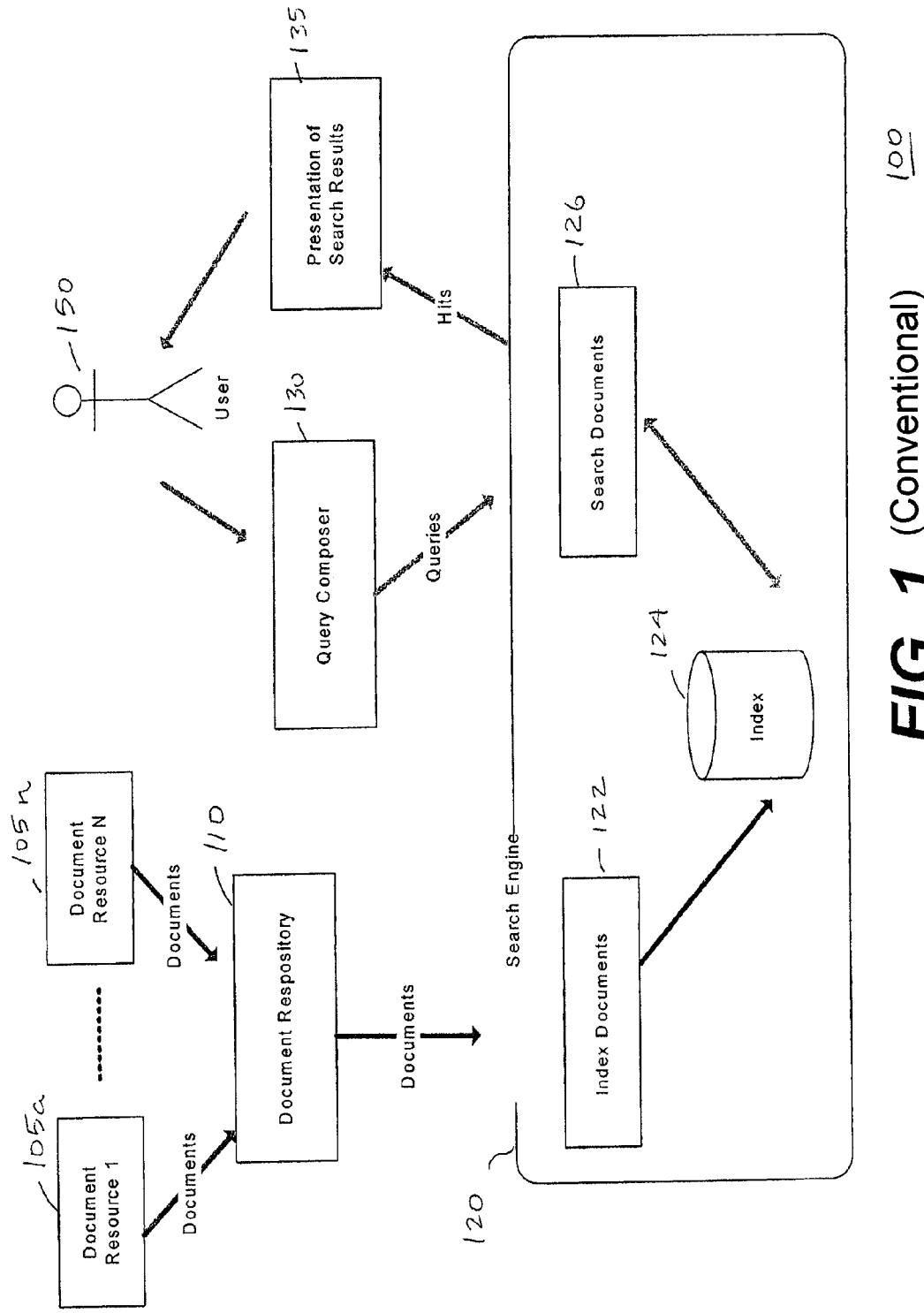
FIG. 1 (Conventional)

MATCHING ENGINE FOR QUERYING RELEVANT DOCUMENTS

CROSS REFERENCE TO RELATED APPLICATIONS

This application claims a benefit of U.S. Provisional Patent Application No. 60/679,314, filed May 9, 2005, and titled "Matching Engine for Querying Relevant Documents with Signature Generation and Relevance Detection of Text Documents", the contents of which is herein incorporated by reference in its entirety.

This application is related to U.S. patent application Ser. No. 11/361,340, filed Feb. 24, 2006, and titled "Matching Engine with Signature Generation", by the same inventors as the present application, the contents of which is herein incorporated by reference in its entirety. U.S. patent application Ser. No. 11/361,340 has subsequently issued on Apr. 7, 2009 as U.S. Pat. No. 7,516,130.

BACKGROUND

1. Field of Art

The present invention generally relates to the field of search engine technologies, and more specifically, to the field of enterprise search engines for querying relevant documents from a document repository.

2. Description of the Related Art

In general, an enterprise search engine is a software system to search relevant documents with given query statements. The enterprise search engine typically consists of a crawler, an indexer, a searcher and a query engine. The crawler gathers documents from pre-assigned locations and dumps them into document repositories. The indexer fetches documents from the document repositories, creates indices from the documents, and stores the indices into an index database. The searcher searches the index database and returns a list of relevant documents (referenced as "hits") in response to a specific query. The query engine parses a query expression provided by a user and sends query commands to searcher for processing.

Conventional search engine technologies are insufficient to search relevant documents for many query problems. For example, consider a problem in which the relevance of two documents is assumed to be measured at some predetermined percentage value, for example, X %. Given an input document and the percentage value X %, a search of relevant documents from the document repositories is conducted so that the relevance between this input document and any of the returning documents must be greater than X %.

The direct application of the conventional search engine to the above query problem results in several disadvantages. For example, there is a lack of an accurate and efficient measurement of the document relevance. In addition, conventional systems return a large list of documents, most of which may not be relevant to all. Thus, the precision rate of retrieval is low. Returning a large list of documents is a common problem of all conventional search engine technologies because the query presented by key terms is unable to precisely depict the documents that users are trying to retrieve.

While returning a large number of irrelevant documents, another problem with conventional search engines is they are language dependent. For each written language, a conventional search engine has to implement different language parsers and analyzers. This results in a large use of resources and generally is not efficient.

Yet another problem with conventional search engines is that they measure relevance of documents through models that are often inaccurate or are highly computing intensive. Examples of these inaccurate and resource intensive models include a term vector-space model, a probabilistic model, a latent semantic space mode, and the like.

Hence, there is a need for a system and a method to modify and improve the conventional search engine architecture to efficiently execute the queries to return documents having a high degree of relevance.

SUMMARY

In one embodiment, search engines may be configured to efficiently execute queries to return documents having a high degree of relevance. A relevance detection engine configured in accordance with the disclosure herein calculates a relevance (or similarity) between a given document and a list of other documents based on a predefined degree of document relevance.

In one embodiment a system (and a method) is configured to receive an initial document that includes text. In addition, the system receives a list of documents, which also include text. The list of documents is used for matching against the initial (or given) document. The system may also receive a predetermined value corresponding to a degree of relevance sought in terms of percentages. For example, the system may ask for documents having at least X %, e.g., 95%, relevance so that documents below, X %, e.g., 95%, relevance are filtered out as an end result.

The system receives a minimum substring match length and normalizes the text of the documents of the list of documents. In one embodiment, the system sorts the text of the initial document prior to beginning its search and may also generate a hash value for substrings of the text of the initial document prior to beginning its search. When the system does initiate a search it searches common sub-strings between the text of the initial document and the text of each document of the list of documents. It then calculates a match percentage based on the search common sub-strings. In one embodiment the system is configured to calculate a match percentage based on a similarity function. The system then outputs documents having a match percentage corresponding to the predetermined value corresponding to the degree of relevance initially defined.

The relevance detection engine beneficially is configured to determine document relevance in percentage measurements. The configuration is structured so that irrelevant documents included in hits can be filtered out by a percentage threshold. This increases search engine utilization and provides results having a greater degree of acceptance.

In one embodiment, the relevance detection engine is beneficially structured to provide a document filter. It calculates a relevance (or similarity) between a given document and a list of other documents based on the definition of document relevance. The relevance is given in percentages. For a given threshold X %, the engine filters out the documents in the list that have relevance less than X %.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

FIG. 1 illustrates one embodiment of a conventional architecture of a search engine.

DETAILED DESCRIPTION

Figure 2:
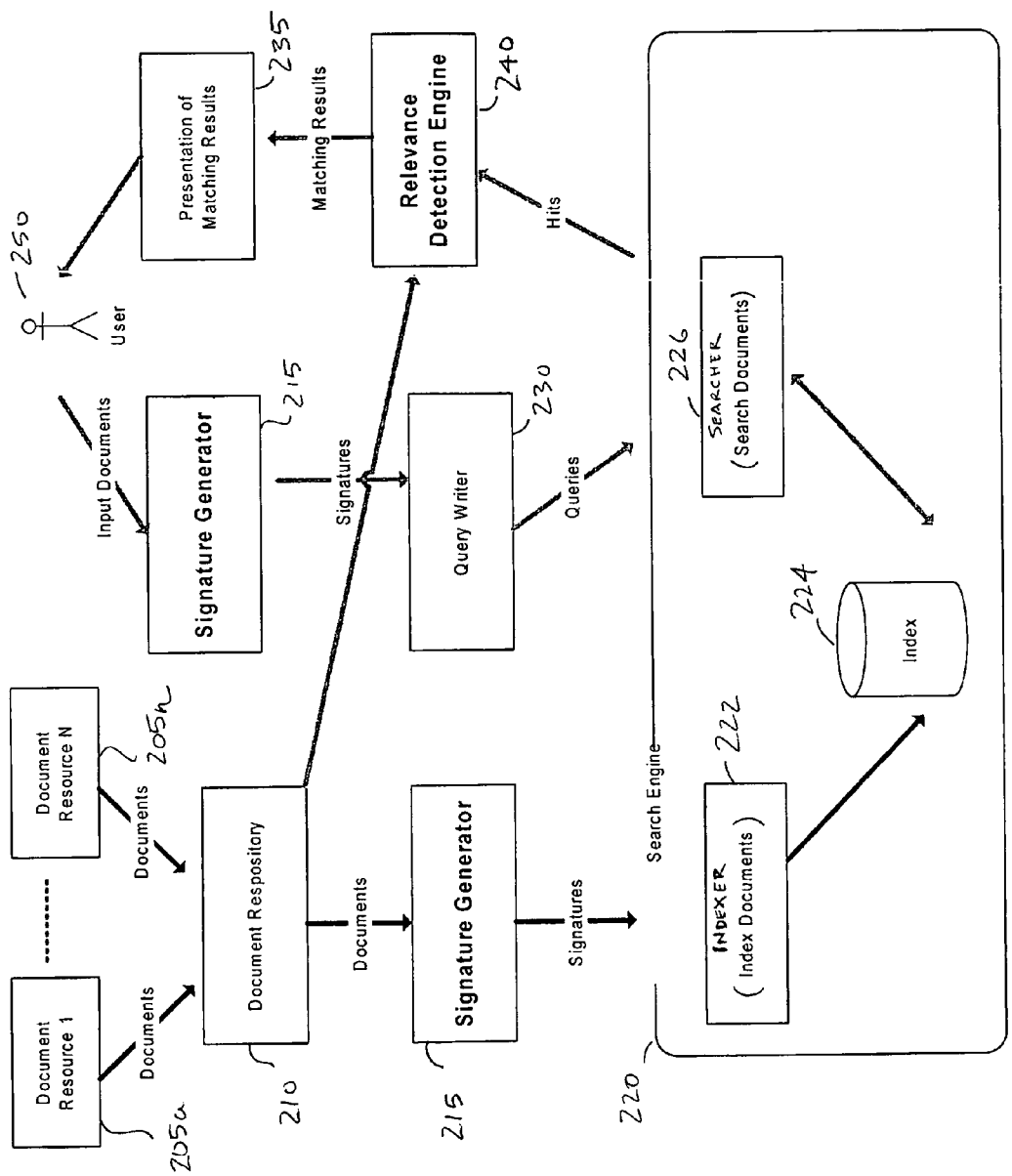
FIG. 2 illustrates one embodiment of an architecture of a matching engine in accordance with the present invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

Generally, the disclosed embodiments describe a system and a method to generate at least one signature associated with document. The signature is used to obtain relevant results to a search query, for example, in an enterprise computing system. In one embodiment, a document comprised of text is received and parsed to generate a token set. The token set includes a plurality of tokens. Each token corresponds to the text in the document that is separated by a predefined character characteristic. A score is calculated for each token in the token set based on a frequency and distribution of the text in the document. Each token is then ranked based on the calculated score. A subset of the ranked tokens is selected and a signature is generated for each occurrence of the selected tokens. The selected list of signatures is then output. The system and process are further described herein.

Reference is first made to FIG. 1, which illustrates one embodiment of a conventional architecture of a search engine 100. The conventional architecture 100 includes one or more documents 105(*a-n*) that are stored in a document repository 110. The documents are then indexed by a search engine 120 and the indexed documents 122 are stored in an index database 124.

Subsequently, a user 150 seeking information will compose a query 130 to search documents 126 in the search engine 120. The search is conducted against the indexed documents 122 in the index database 124. When a match or matches are found corresponding to the query, the search engine returns the relevant indexed documents as search results that are presented to the user 150.

This process, while an improvement over traditional labor intensive search operations, still has limitations. The indexed documents may not necessarily be relevant with respect to the context of the query. Hence, a search for documents related to National Football League scores may return results related to the English Football (Soccer) rather than the American Football league.

FIG. 2 illustrates one embodiment of an architecture of a matching engine in accordance with the present invention. In an embodiment, one or more documents resources 205(*a-n*) are collected (or stored) in a document repository 210. Generally, the architecture is structured to pre-process the tokens from the document, select the most informative tokens, and, based on the informative tokens, generate signatures associated with the document. The architecture also is configured to ensure uniqueness of the generated signatures with respect to an input document context. The architecture is further configured to limit the number of signatures collected while keeping the stability of the collection across varied versions of the same document. It is noted that in one embodiment, the signature is a value, for example, a hash representation corresponding to particular information or a string of ASCII characters in accordance with the selected tokens.

Referring now to an embodiment of a process with respect to the architecture, initially it is noted that documents 205 may be collected manually or through use of a crawler. For example, a crawler may be configured to visit all assigned document sources to collect documents, assigns a unique document identifier (ID) to each document that is collected, and then place the unique document ID and document into the document repository 210.

Next, a signature generator 215 generates a list of signatures from particular documents in the document repository 210. Signatures are strings or values that one makes from the unique information that represents a document. This representative information is unique to the document and stable when the document has moderate changes. The signature generator 215 can be configured to store one or more signature generation processes. The signature generator 215 can be further configured to select and execute among one of the stored processes based on a type of document to be processed. For example, one embodiment of a signature generation process is adapted (configured) for use with English language documents, for example, in ASCII code, and is further described with respect to FIG. 3. The process can also apply to other languages that may use lower cases, stop-words and stemming, for example, Romance and Latin languages. Another embodiment of a signature generation process is adapted for use with documents in UTF-8 (universal transformation format) encoding for any language supported by Unicode, and is further described with respect to FIG. 4.

Once the signature generator 215 generates signatures for the particular document, an indexer 222 indexes the document with unique document identifier (ID) and the signatures generated by the signature generator 215. The result is an indexed document (by indexer 222) that is stored in an index database 224 of a search engine 220.

With the indexed document in the index database 224 of the search engine 220, the document is ready to be queried against. A user 250 uses a query writer 230 to compose a query expression based on the signatures generated by the signature generator 215. It is noted that the input document provided by a user 250 provides a query input. The user 250 does not need to know what the signatures are; rather, the user 250 only needs to know what is the input document. The user 250 passes the input document to signature generator 215. The signatures output from the signature generator 215 are passed to the query writer 230 for query composition. The composed query is then passed to a searcher 226 (search mechanism) for searching documents.

The searcher 226 in the search engine 220 searches the index database 224 using the query provided through the query writer 230. The searcher returns a list of possible relevant documents 226 ("hits") to a relevance detection engine

240. The relevance detection engine 240 calculates a relevance (e.g., in percentage terms) between the input document and the hits. The relevance detection engine 240 is configured to include one or more processes for a relevance calculation (or analysis). A first embodiment of a relevance detection process is further described with respect to FIG. 5. A second embodiment of relevance detection process is further described with respect to FIG. 6. It is noted that the relevance detection engine 240 can select and/or implement either of these processes. For example, for small documents, the first embodiment of the relevance detection process can be deployed and for larger documents, e.g., greater than 10 MB in size, the second embodiment of the relevance detection process can be deployed.

The matching engine architecture beneficially provides for a unique configuration. For example, a query structured so that for a given document D and percentage X %, it searches a list of documents $\{D_1, \ldots, D_n\}$ from a document repository so that the relevance between D and all of $\{D_1, \ldots, D_n\}$ are greater than X %.

Signature Generation

Figure 3:
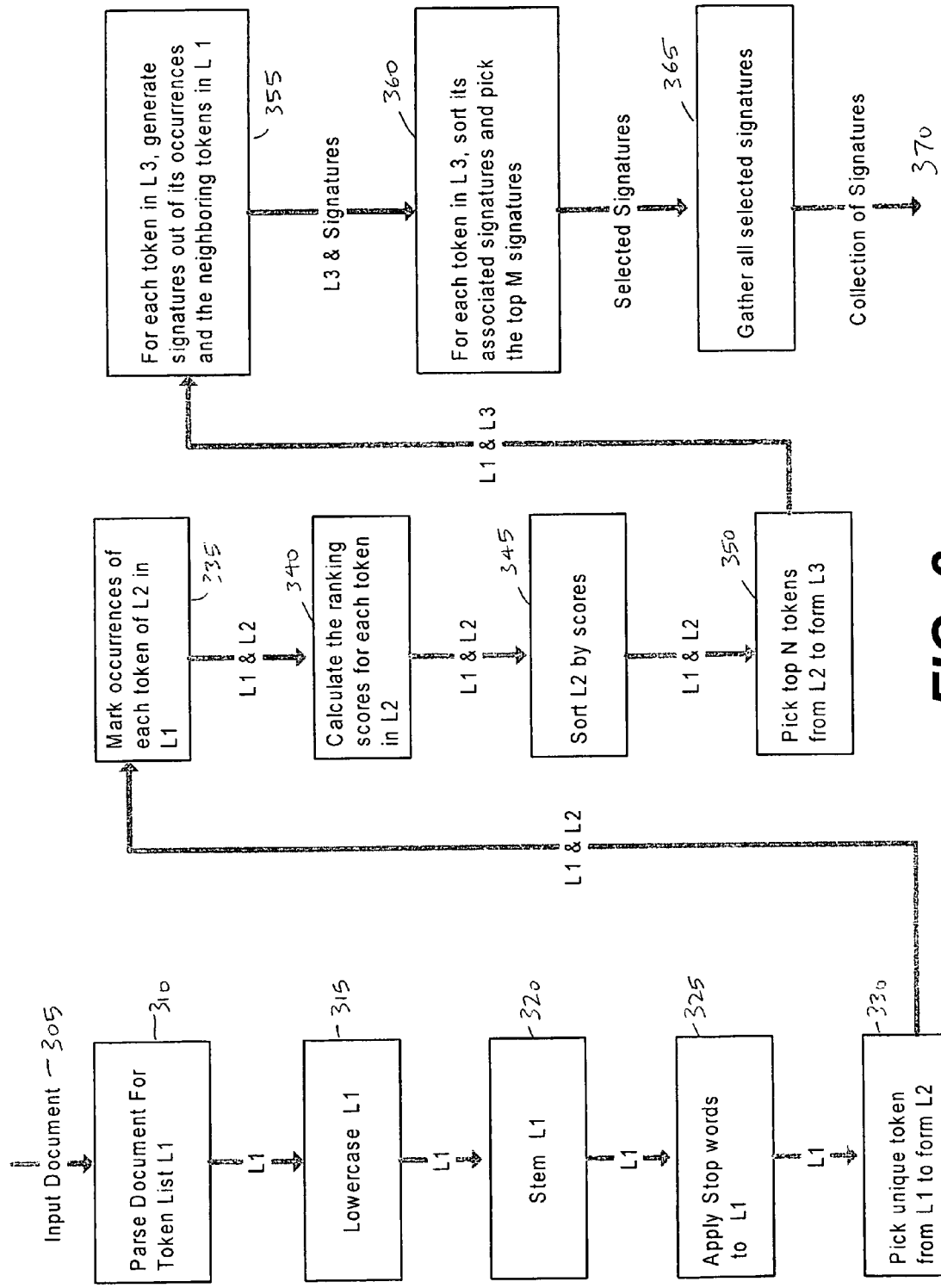
FIG. 3 illustrates a first embodiment of a signature generation process in accordance with the present invention.

FIG. 3 illustrates a first embodiment of a signature generation process in accordance with the present invention. This embodiment illustrates generating signatures from an English document encoded in ASCII codes. The process begins with inputting 305 the document. The process parses 310 the document to generate (or create) an initial list of one or more tokens (a token list). In one embodiment, a token includes text in the document separated by a predefined character characteristics. Examples of predefined character characteristics include a delimiter. Once tokens are separated, functions such as stemming, stop-word or lower case analysis can be applied.

The process continues with lower casing 315 each token of the token list. Lower casing 315 is a function that converts each letter of a token to a lower case character. The process also stems 320 each token of the token list. It is noted that word stemming is a process to identify or extract core roots from a word. Continuing, the process applies 325 a stop-word-list to each token of the list to formulate a new first token list (L1). The stop words are words that are considered as carrying no information. Examples of stop words include 'the', 'are', 'do', 'am' and the like. In addition, the process stems each member of a stop-word-list.

The process selects (or picks) 330 each unique token of the first new token list ($L_1$) to form a second token list ($L_2$). For each token in the second token list L2, the process marks 335 its positions of occurrences in the first token list L1 to generate sets:

$L_1 = \{t_1, t_2, \ldots, t_n\}$ $L_2 = \{T_1, T_2, \ldots, T_m\}$, where denote $T_i \sim <P(i,1), P(i,2), \ldots, P(i,S_i)>$ to mark the positions of occurrences and where i=1, ..., m and where $S_1 + S_2 + \ldots + S_m = n$.

The process then calculates (or generates) 340 a ranking score of each token in the second token list L2. The scores may be determined by:

$Score(T_j) = [P(j,S_j) - P(j,1)] * S_j * Weight(T_j) / Sqrt(D_j)$, where $D_j [P(j,2) - P(j,1)]^2 + [P(j,3) - P(j,2)]^2 \ldots + [P(j, S_j) - P(j, S_{j-1})]^2$ In addition, a score function measures the importance of a token in the text by the frequency and also its assigned weight. It is noted that weight( ) may be a pre-defined function. In one embodiment, its value is a '1', although in alternative embodiments its value may be some pre-assigned number, e.g., 6.8, if the token contains some special characters like '—', '_' and '@'. The score function may be determined by $S_j$*Weight ($T_j$). The score function may be used to evenly distribute tokens over the document to get better scores. This is determined by $[P(j,S_j) - P(j,1)]/Sqrt(D_j)$.

Next, the process sorts 345 the second token list $L_2$ by the calculated scores and then selects (or picks) 350 the top N tokens by score from that list ($L_2$). It is noted that N can be any integer and may be predefined within the system or may be selected as an input into the system. The top N tokens by score from the second token list $L_2$ creates a third token list $L_3$. For each token $T_j$ of the third token list $L_3$, generate 355 signatures out of its occurrences and the neighboring tokens in $L_1$. This process also can be represented as:

For each $k \in \{P(j,1), P(j,2), \ldots, P(j,S_j)\}$, pick its neighboring 2d tokens in L1 and concatenate them together to form a string, that's $t_{k-d} + \ldots + t_{k-1} + t_k + t_{k+1} + \ldots + t_{k+d}$.

Encoding this string gives us a signature $F_{j,k}$.

For each $T_j$ in the third token list $L_3$, the process sorts the list $\{F_{j,1}, F_{j,2}, \ldots F_{j,Sj}\}$ and selects 360 the top M signatures from this sorted list. It is noted that M can be any integer and may be predefined within the system or may be selected as an input into the system. Next, for all members of the third token list $L_3$, there is a total of (N*M) selected signatures are gathered (or collected) 365. The process then outputs 370 the collection of signatures.

Figure 4:
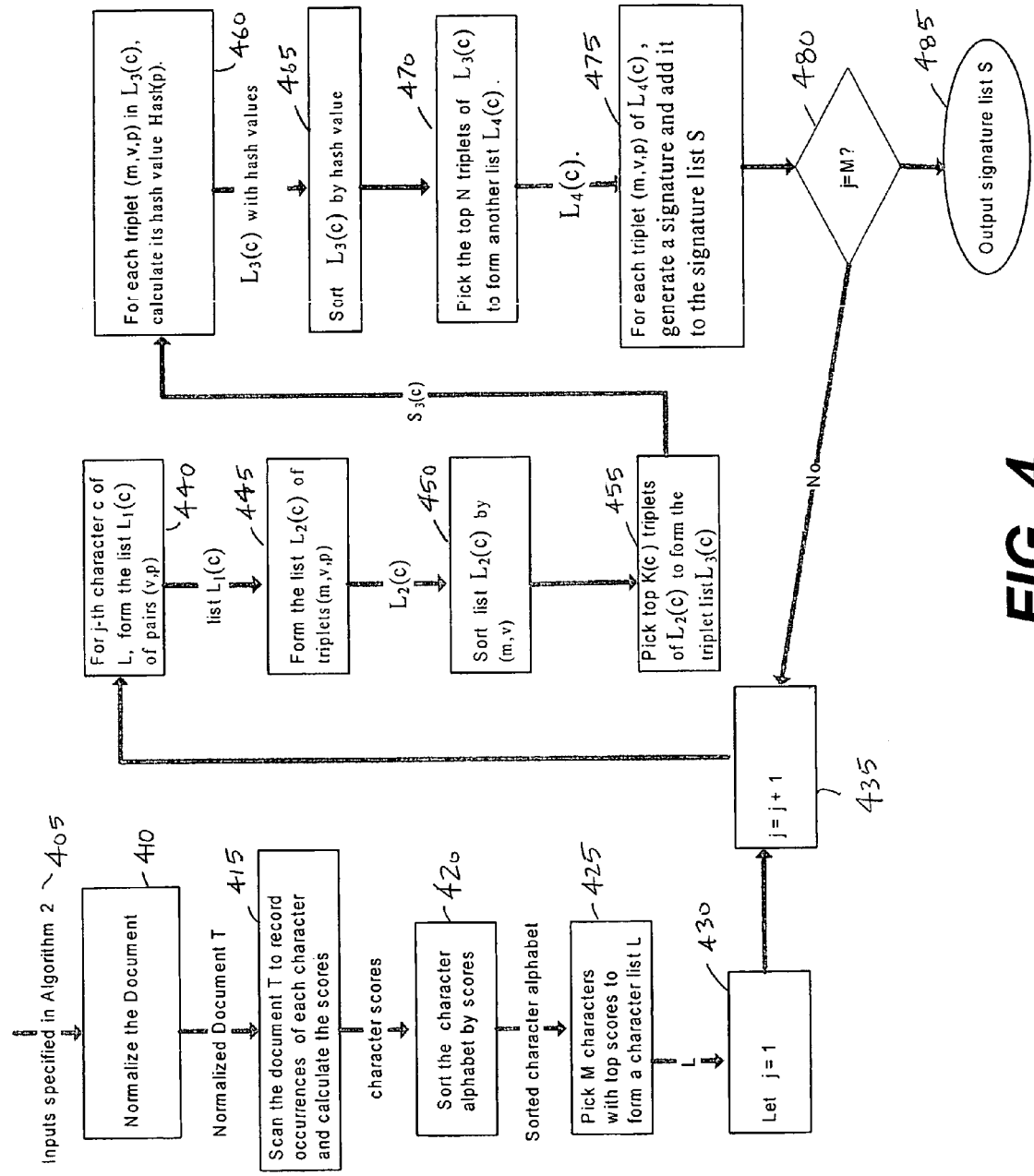
FIG. 4 illustrates a second embodiment of a signature generation process in accordance with the present invention.

FIG. 4 illustrates a second embodiment of a signature generation process in accordance with the present invention. The second embodiment includes a process that inputs 405, for example, a textual document of any language in plain UTF-8 format (universal transformation format) and a list of characters in UTF-8 alphabet that we consider as being informative. In addition, other inputs may include some number M, which corresponds to a number of characters with top ranking scores, and some number N, which corresponds to a maximum signature number for each character. Other optional inputs may include a constant integer CHAR_NEIGHBOR, which can have a predefined value, for example, 30. This constant integer defines a size of a character's neighbor in a text string, which will be used to generate signatures. Another input is a selection rate R. It has a predefined range between 0 and 1, for example, 0.20. The selection rate is a number for use of selecting a subset out of a set. Yet another input may be an empty signature list S.

The process normalizes 410 the document by scanning the document to remove the characters that are not informative. A non-informative character is a UTF-8 character that does not contribute to the text context. They may provide other purposes such as formatting. For example, if a string has n consecutive spaces, then n−1 spaces are considered non-informative. Other examples of non-informative characters include control (CTRL) characters and returns.

The process then scans 415 the normalized document to record the occurrences of each character, c, in the UTF-8 alphabet. The position of the occurrences is denoted as P(1, c), P(2,c), ..., P(n,c). The process calculates (or generates) the ranking score for the character c using:

$Score(c) = Sqrt(n) * [P(n,c) - P(1,c)] / Sqrt(D)$ where $D = [(P(2,c) - P(1,c)]^2 + [(P(3,c) - P(2,c)]^2 + \ldots + [(P(n,c) - P(n-1,c)]^2$. The score function measures an importance of a character in the text by its frequency. The score function also ensures that the characters that are evenly distributed over the document get better scores. A calculation for achieving this includes:

$$[P(n,c)-P(1,c)]/\operatorname{Sqrt}(D).$$

The process continues with sorting 420 the character alphabet by score and then selects (or picks) 425 the M characters with top scores. This generated list may be denoted as character list L. It is noted that M can be any integer and may be predefined within the system or may be selected as an input into the system as previously described.

For each character c in the character list L, at each occurrence p of character c, the process calculates its neighbor. In particular, the process values by taking its left and right character and concatenating all the encoding bytes together to form an integer v. This neighbor-value v and the occurrence p make a pair (v, p). Next, the process assigns a value of 1 to a variable j. Variable j is an enumeration of the list L. By using j, members of L may be processed one by one. In the illustrated process, this structure is used to realize a concept of "each" and is incrementally increased. In turn, this forms 440 a list $L_1(c)$ of pairs for each character c in the character list L. The size of the list $L_1(c)$ may be denoted as N(c). For each list $L_1(c)$, the process counts the repeats m of each neighbor-value v in the list to form 445 a second list $L_2(c)$ with triplets (m, v, p). The size of the second list $L_2(c)$ also may be denoted as N(c). Each list $L_2(c)$ is sorted 450 by (m, v), where m is the first comparison parameter and v is the second comparison parameter.

The process selects (or picks) 455 the top K(c) triplets from the second sorted list $L_2(c)$, where $K(c) \leq R*N(c)$. This forms a third list $L_3(c)$. For each triplet (m, v, p) of the third list $L_3(c)$, the process calculates 460 its hash value by a hash function, hash(p), which generates hash value with the neighboring characters surrounding the occurrence position p. An example of an applicable hash function may be the conventional Karp-Rabin hash function. The number of neighboring characters is determined by CHAR_NEIGHBOR. The process sorts 465 the third list $L_3(c)$ by hash value and selects (picks) 470 up to N triplets from the top of sorted list $L_3(c)$ to form a fourth list $L_4(c)$. It is noted that N can be any integer and may be predefined within the system or may be selected as an input into the system as previously noted. For each triplet (m, v, p) in $L_4(c)$, the process generates 475 a signature using the characters surrounding the occurrence position p and add it into signature list S. The process then outputs 485 a signature list S. It is noted that process described is iterative, and therefore, is iterated for all characters c in list L.

The signature generator is a unique configuration that beneficially replaces the roles of keywords when composing queries. The signature generator is efficient because it reduces the size of hits. This increases the performance of the matching engine. Moreover, the signature generator improves the search precision rate of the matching engine. Further the signature generator can be structured to be language-independent, thus expanding the scope of documents available for search.

Overall, signatures play a particular role in a search engine in a manner that is may be more useful than conventional keywords. Signatures are abstracted from documents in a manner as described herein to characterize/represent documents better than keywords. Hence, they are more relevant to the documents than keywords. Note that signatures may be different than keywords in that a signature is strongly relevant to a document while a keyword is not necessarily so, two irrelevant documents do not share any signature while they could own the same single keyword, and signatures achieve better search precision rates than keywords.

Relevance Detection

A system in accordance with the present invention also may include opportunities for relevance detection. With respect to relevance detection, each document can be considered as a string of characters (ASCII, Unicode, etc.) of an alphabet. Thus, the relevance of two documents is strongly related to the similarity of two strings. There are conventional approaches to define the similarity of two strings. One approach is to get the largest common subsequence of two strings. A second approach is to extract the largest common substring of two strings. However, both of these approaches do have limitations that often make their use inadequate. The largest common string approach does not include other smaller common substrings, and therefore, is not accurate. The largest common subsequence approach cannot deal with content swapping, and therefore, is also inaccurate.

A third approach, in accordance with the present invention, starts with string similarity. For example, consider two strings str1 and str2, and a list S of substrings of the $2^{nd}$ string str2. This list satisfies conditions that all members in S do not overlap, the length of each member in S should be greater than a minimum value M, and each member of S is also a substring of str1. It is noted that M can be any integer and may be predefined within the system or may be selected as an input into the system.

For all sets of substrings satisfying the noted three conditions, S gets maximal sum of all substring lengths. A function SIM is applied to measure the similarity of str2 to str1. The function may be defined by:

$$SIM(str2,str1)=(\text{sum of lengths of all substrings in } S)/(\text{length of } str2)*100\%$$

It is advised that the function SIM is not symmetric, i.e., $SIM(str1,str2) \neq SIM(str2,str1)$. For example, consider str1="AAAAACCCCCCCCBBBBBBDDDDDDAAAAAA LLLLLLL" and str2="CCCCCCCCCZZZZZAAAAAAA BBBBTTTTLLL". The required minimum of substring length may be set, for example, as M=4. Then S={"AAAAAA","CCCCCCCC","BBBB"} the substrings of str2 is what is needed to calculate a similarity:

$$SIM(str2,str1)=18/27=67\%.$$

The example above illustrates one embodiment of similarity of two strings that is actually defined by substring copies from str1 to str2 with a minimum size requirement of each copy. In text documents, there are many characters that are not necessarily contributing to the document context. For example, extra space and invisible characters are not informative at all. Hence, these useless characters are first removed from the documents before applying the function SIM. This process may be referenced as string normalization. For example, the string "There are some useless characters in this sentence !" can be normalized as "There are some useless characters in this sentence!". In this example, there are unneeded (or useless) spaces between words in the original sentence and only one space between words after normalization.

In addition to the above, consider the following example given two text documents doc1 and doc2 in plain ASCII or UTF-8 format. Initially, documents doc1 is normalized to become string str1 and document doc2 is normalized to become string str2. The relevance of doc2 to doc1 is defined by SIM (str2, str1), which can be denoted as RLVN(doc2, doc1). The function RLVN is not symmetric in this example.

Next, string suffixes are considered. Given a string $X=x_0x_1 \ldots x_n$ of n+1 characters, where the first n characters comprise the actual string and $x_n=\$$ is a unique sentinel character not defined in the ASCII or UTF-8 table, a suffix of X starting in the position i where i=0, 1, . . . , n, is denoted as S(X,i). In this example, S(X,0)=X and S(X,n)=$ and the string X has n+1 suffixes (or suffix strings). In addition, the suffix strings are sorted. String X has n+1 suffix strings. These can be sorted lexicographically by any means. Suffix sorting is a conventional algorithm problem known to those skilled in the art.

Figure 5:
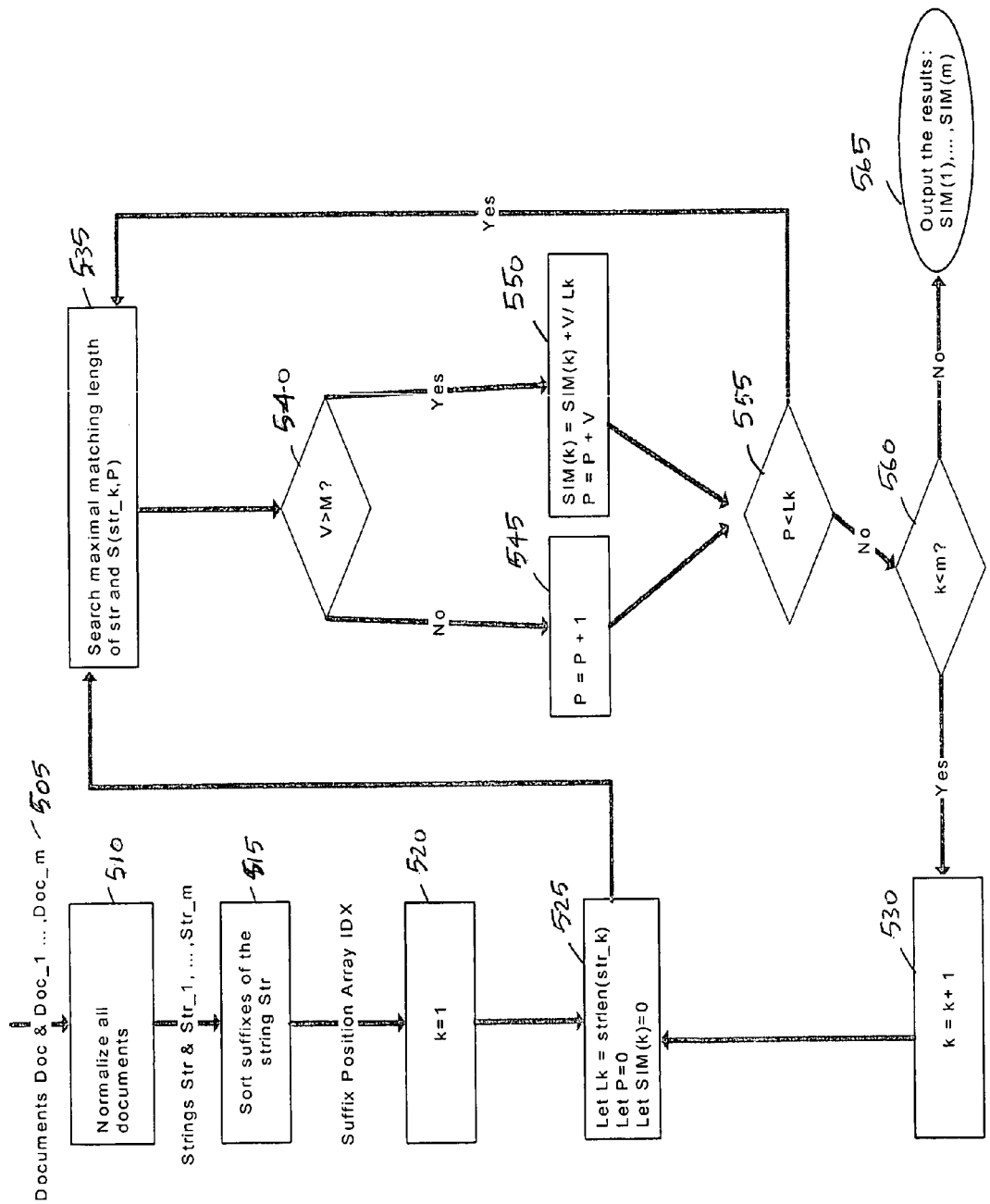
FIG. 5 illustrates a first embodiment of a relevance detection process in accordance with the present invention.

With the above overview in mind, reference is now made to FIG. 5. FIG. illustrates a first embodiment of a relevance detection process in accordance with the present invention. The process starts with input 505 of an initial document (e.g., referenced as doc) plus one or more additional documents, plus an integer M. By way of example, there the list of additional documents may be a list of text documents to be matched. The additional documents may be referenced as $doc_1$ (or doc_1) through $doc_m$ (or doc_m), where m is the number of additional documents and M is an integer corresponding to a minimum substring match length. It is noted that M can be any integer and may be predefined within the system or may be selected as an input into the system as previously described.

The process normalizes 510 all the documents, initial doc plus additional $doc_1$, through $doc_n$, to get strings str, $str_1$ (or str_1) through $str_m$ (or str_m). Through use of a conventional suffix sorting algorithm, the process sorts 515 the suffixes of str with an array IDX to record the suffix string positions. It is noted that array IDX is known in conventional suffix sorting algorithms. The process then assigns (or lets) 520 a variable, k, to be assigned a value, for example, assigning k=1. It also assigns (lets) 525 variable L be a length of string str, variable $L_k$ be the length of $str_k$, variable P=0, and $SIM_k=0$.

The process next searches 535 a maximum matching length of string str and $S(str_k, P)$. In particular, the process assigns (lets) variable V=searchMaxMatchLen (IDX, 0, L, str, L, $S(str_k,P)$, $L_k-P$), where searchMaxMatchLen ( ) is a recursive function to calculate the maximal matching length of string str and $S(str_k, P)$ as defined further:

```
int searchMaxMatchLen (int IDX, int start, int end, char *str, int len,
char *str2, int len2) {
int i, j;
if(end-start < 2) {
i = getMaxMatchSize(str+IDX[start], len -IDX[start], str2, len2);
j = getMaxMatchSize(str+IDX[end], len -IDX[end], str2, len2);
if(i > j)
   return i;
else
   return j; }
i = start+(end-start)/2;
if(strncmp(str+IDX[i], str2, minimum(len-IDX[i], len2)) < 0)
   return searchMaxMatchLen (IDX, i, end, str, len, str2, len2);
else
return searchMaxMatchLen (IDX, i, start, str, len, str2, len2); }
int getMaxMatchSize(char *str, int len, char *str2, int len2) {
int i;
for(i = 0; (i < len) && (i < len2); i++)
if(str[i] != str2[i]) break;
return i; }
```

The above illustrates an example of a function searchMaxMatchLen to search the suffix string (of string str) which shares the longest common prefix substring with another string str2. This function is implemented by a binary search. The function getMaxMatchSize is to get the longest common prefix among two strings. Next, the process determines 540 V>=M, then it assigns 550 $SIM_k=SIM_k+V/L_k$, P=P+V. Otherwise, if the process determines 540 that condition V>=M is not met, the process increments 545 variable P so that P=P+1. If the process then determines 555 that P<$L_k$, the process goes back to searching 535 a maximum matching length of string str and $S(str_k, P)$.

If the process determines 555 that the condition P<$L_k$ is not met, the process then determines 560 if k<m. If k<m, the process increments 530 k by k=k+1 and process goes back to assign 525 variable L be a length of string str, variable $L_k$ be the length of $str_k$, variable P=0, and $SIM_k=0$. If the process determines 560 that condition k<m is not met, the process outputs 565 the results of $SIM_1, \ldots, SIM_m$.

The output advantageously presents a similarity in percentages between an input document and a list of additional documents. For example, as illustrated above there is given x % and an input document to find the documents in the stored index document database. The process beneficially generates the signatures of the input document by signature generator. The searcher searches the index database using the signatures and returns a list of documents (hits), each of which shares at least one common signature with the input documents. The relevance detection process calculates the similarity between the input document and each document in the list. These are output as $SIM_1, \ldots, SIM_m$. The process can now select documents that satisfy $SIM_k>=x\%$. This logic also is implied through the matching engine architecture.

Figure 6:
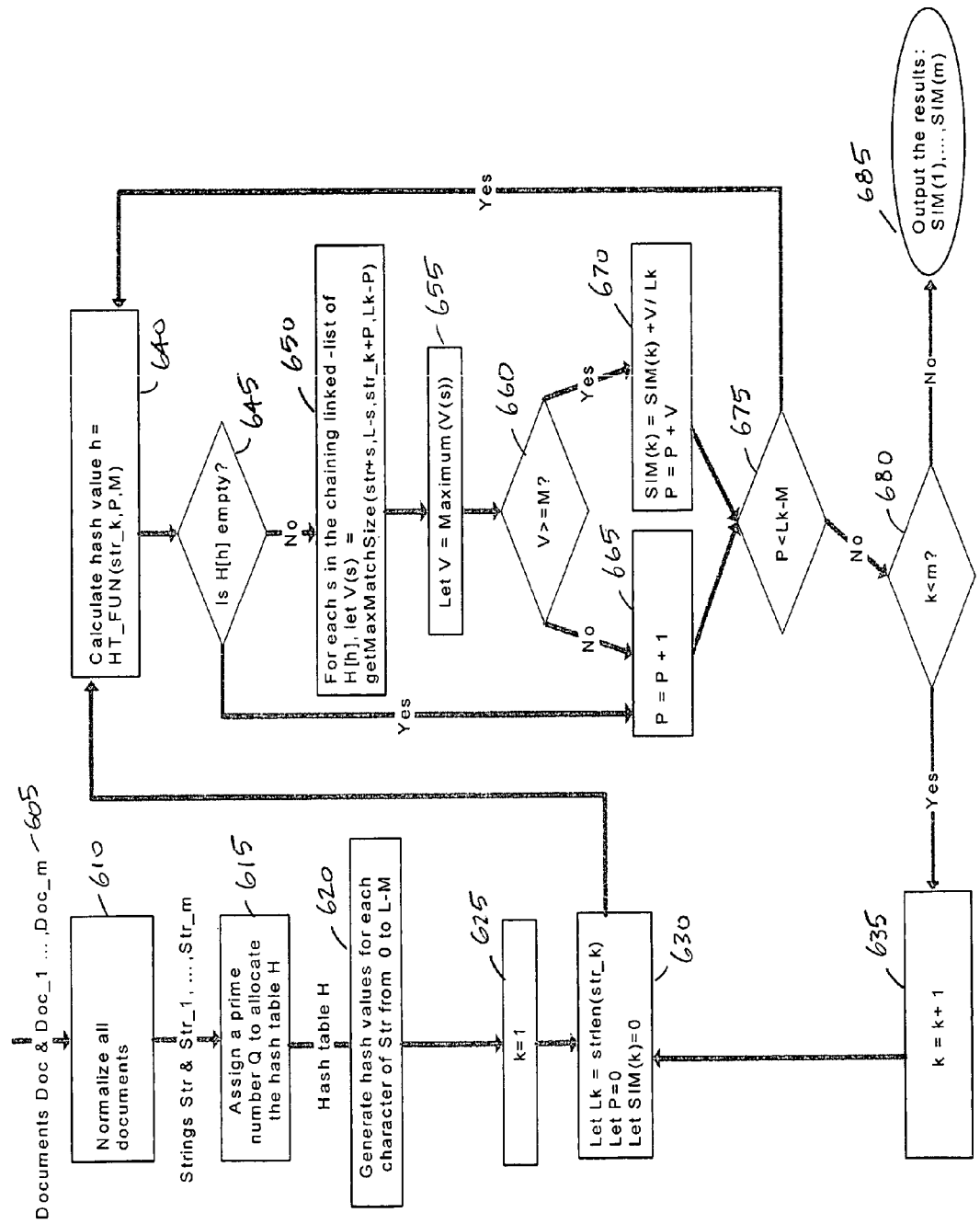
FIG. 6 illustrates a second embodiment of a relevance detection process in accordance with the present invention.

Referring now to FIG. 6, it illustrates a second embodiment of a relevance detection process in accordance with the present invention. The process begins with an input 605 of an initial text document, referenced as doc, and a list of text documents to be matched to the doc, plus an integer M. The list of text documents is referenced as $doc_1, \ldots, doc_m$. where m is the number of text documents and M is a minimum substring match length. It is noted that M can be any integer and may be predefined within the system or may be selected as an input into the system as previously described.

The process normalizes 610 doc, $doc_1, \ldots, doc_m$ to generate (or produce) strings str, $str_1, \ldots, str_m$. Next, the process assigns 615 a prime number, Q, which is larger than the size of string str and is referenced as L. By way of example, assume for purposes of describing this embodiment that Q=3*L/2. The process allocates an array H with size Q for a hash table with chaining capability to resolve collisions of hash values. For a given variable, j=0 to L−M, the process generates 620 a hash value, h=HT_FUN(str, j, M), and stores the string position, j, in H[h]. Alternatively, it may store it in collision chaining linked-list. The hash function HT_FUN is to calculate a hash value of a substring of the string str, which starts at position j and with a length M. In one example embodiment, a conventional Karp-Rabin hash function may be applied.

Next, a variable k is assigned 625 a value, for example, k=1. Further, values also are assigned 630 for $L_k$ to be the length of string $str_k$, P=0, and $SIM_k=0$. The process calculates 640 a hash value so that h=HT_FUN($str_k$, P, M). The process looks up a hash table entry H[h] and determines 645 if H[h] is empty. If H[h] is not empty, then for each string position s of the chaining linked-list at H[h], the process assigns 650 a variable V(s)=getMaxMatchSize(str+s,L−s, $str_k$+P, $L_k-P$) to get the maximal matching length of two sub-strings. The process then assigns V=maximum(V(s)). Variable V represents the length of the largest prefix string of $S(str_k,P)$ and this prefix is also a substring of string str.

If the process determines 660 that V>=M, it assigns 670 $SIM_k = SIM_k + V/L_k$, and P=P+V. If it determines 660 that V<M, it assigns 665 P=P+1. Likewise, if the process had determined that H[h] is empty, it would assign 665 P=P+1. In either of these latter aspects of the process, the next step is to determine 675 if P<$L_k$-M. If P<$L_k$-M, the process goes back to calculating 640 a hash value so that h=HT_FUN($str_k$, P, M). However, if the process determines that P is not less than $L_k$-M, it then determines 680 whether k<m. If k<m, the process increments 635 k so that k=k+1 and assigns values 630 for $L_k$ to be the length of string $str_k$, P=0, and $SIM_k$=0. If k is not less than m, the process outputs 685 $SIM_1, \ldots, SIM_m$. As noted above, the output advantageously presents a similarity in percentages between an input document and a list of additional documents.

The relevance detection engine beneficially is configured to determine document relevance in percentage measurements. The configuration is structured so that irrelevant documents included in hits can be filtered out by a percentage threshold. This increases search engine utilization and provides results having a greater degree of acceptance.

In one embodiment, the relevance detection engine is beneficially structured to provide a document filter. It calculates a relevance (or similarity) between a given document and a list of other documents based on the definition of document relevance. The relevance is given in percentages. For a given threshold X %, the engine filters out the documents in the list that have relevance less than X %.

Overall, the disclosed matching engine includes a number of unique features and advantages. Application of a signature generator and a relevance detection engine as described above each add unique aspects individually and within a system configuration.

Further, the features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Upon reading this disclosure, those of skill in the art will appreciate still additional alternative structural and functional designs for a system and a process for a matching engine to query relevant documents, which may include a signature generation and relevance detection through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented method for generating an output of documents having a predetermined relevance, the method being performed by a relevance detection engine at a server and comprising:
   receiving an initial document comprising text;
   receiving a list of documents, each document comprising text, for matching;
   receiving a minimum substring match length M;
   normalizing the text of the initial document to form string str, and normalizing the text of the documents of the list of documents to form corresponding strings $str_k$ of lengths $L_k$, where k=1 to m;
   sorting suffixes of the string str with an array to record suffix string positions;
   calculating a similarity SIM(k) between the string str and each string $str_k$;
   searching for a maximal matching length V of the string str and a suffix $S(str_k,P)$ during the calculation of the similarity SIM (k), wherein the suffix $S(str_k, P)$ is a suffix of $str_k$ starting at position P;
   determining whether condition V>M is met;
   if V>M is not met, then incrementing the position P by one;
   if V>M is met, then adding $V/L_k$ to the similarity SIM(k) and incrementing the position P by V; and
   outputting the similarity SIM(k) between the string str and each string $str_k$.

2. The method of claim 1, further comprising:
   determining whether condition $P<L_k$ is met;
   if $P<L_k$ is met, then looping back to search for the maximal matching length V of the string str and the suffix $S(str_k, P)$; and
   if $P<L_k$ is not met, then determining whether condition k<m is met.

3. The method of claim 2, further comprising:
   if k<m is met, then incrementing k by one and looping back to search for the maximal matching length V of the string str and the suffix $S(str_k,P)$; and
   if k<m is not met, then performing said outputting.

4. The method of claim 1, wherein the list of documents comprises a plurality of documents.

5. A tangible computer readable medium structured to store instructions executable by a processor, the instructions when executed causing a processor to:
   receive an initial document comprising text;
   receive a list of documents, each document comprising text, for matching;
   receive a minimum substring match length M;
   normalize the text of the initial document to form string str and the text of the documents of the list of documents to form corresponding strings $str_k$ of length $L_k$, where k=1 to m;
   sort suffixes of the string str with an array to record suffix string positions;
   calculate a similarity SIM(k) between the string str and each string $str_k$;
   search for a maximal and a suffix $S(str_k,P)$ during the calculation of the similarity SIM(k), wherein the suffix $S(str_k, P)$ is a suffix of $str_k$ starting at position P;
   determine whether condition V>M is met;
   if V>M is not met, then incrementing the position P by one; and
   if V>M is met, then add V/Lk to the similarity SIM(k) and increment the position P by V; and
   output the similarity SIM(k) between the string str and each string $str_k$.

6. The tangible computer readable medium of claim 5, further including instructions stored on the tangible medium that cause the processor to:
   determine whether condition $P<L_k$ is met;
   if $P<L_k$ is met, then loop back to search for the maximal matching length V of the string str and the suffix $S(str_k, P)$; and
   if $P<L_k$ is not met, then determine whether condition k<m is met.

7. The tangible computer readable medium of claim 6, further including instructions stored on the tangible medium that cause the processor to:

if k<m is met, then increment k by one and looping back to search for the maximal matching length V of the string str and the suffix $S(str_k,P)$; and if k<m is not met, then perform said outputting.

8. The computer readable medium of claim 5, wherein the list of documents comprises a plurality of documents.

9. An apparatus for determining relevant documents from a document depository, the apparatus comprising:

a data storage system configured to store computer-readable instructions and data;

a processor configured to execute computer-readable instructions; and a network interface configured to communicatively interconnect the apparatus to a data network;

computer-readable instructions stored in the data storage system that are configured to receive an initial document comprising text;

computer-readable instructions stored in the data storage system that are configured to receive a list of documents, each document comprising text, for matching;

computer-readable instructions stored in the data storage system that are configured to receive a minimum substring match length M;

computer-readable instructions stored in the data storage system that are configured to normalize the text of the initial document to form string str of length L and the text of the documents of the list of documents to form corresponding strings $str_k$ of length $L_k$, where k=1 to m;

computer-readable instructions stored in the data storage system that are configured to assign a prime number Q which is larger than L;

computer-readable instructions stored in the data storage system that are configured to allocate a hash table H with size Q;

computer-readable instructions stored in the data storage system that are configured to calculate a similarity SIM(k) between the string str and each string $str_k$;

computer-readable instructions stored in the data storage system that are configured to calculate a hash value h of a substring of the string $str_k$ which starts at position P and with a length M;

computer-readable instructions stored in the data storage system that are configured to determine whether H[h] is empty;

computer-readable instructions stored in the data storage system that are configured to increment P if H[h] is empty;

computer-readable instructions stored in the data storage system that are configured to determine a maximum matching length V of the string str and a suffix $S(str_k, P)$ during the calculation of the similarity SIM(k), wherein the suffix $S(str_k, P)$ is a suffix of $str_k$ starting at position P;

computer-readable instructions stored in the data storage system that are configured to determine whether condition V greater than or equal to M is met;

computer-readable instructions stored in the data storage system that are configured to increment the position P by one if V greater than or equal to M is not met;

computer-readable instructions stored in the data storage system that are configured to add $V/L_k$ to the similarity SIM(k) and increment the position P by V if V greater than or equal to M is met; and computer-readable instructions stored in the data storage system that are configured to output the similarity SIM(k) between the string str and each string $str_k$.

10. The apparatus of claim 9, further comprising:

computer-readable instructions stored in the data storage system that are configured to determine whether condition $P<L_k-M$ is met;

computer-readable instructions stored in the data storage system that are configured to, then loop back to search for the maximal matching length V of the string str and the suffix $S(str_k,P)$ if $P<L_k-M$ is met; and computer-readable instructions stored in the data storage system that are configured to determine whether condition k<m is met if $P<L_k-M$ is not met.

11. The apparatus of claim 10, further comprising:

computer-readable instructions stored in the data storage system that are configured to increment k by one and looping back to search for the maximal matching length V of the string str and the suffix $S(str_k,P)$ if k<m is met; and computer-readable instructions stored in the data storage system that are configured to perform said output said similarity S(k) if k<m is not met.

* * * * *